US011448360B1

(12) United States Patent
Tang et al.

(10) Patent No.: US 11,448,360 B1
(45) Date of Patent: Sep. 20, 2022

(54) CASE MOUNTED STAND (71) Applicant: Baker Hughes Holdings LLC, Houston, TX (US)

(72) Inventors: Andrew Tang, Camillus, NY (US); Gerard Frederick Beckhusen, Skaneateles, NY (US); Jeffrey Quesnel, Skaneateles, NY (US); Jason Pennell, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 17/202,500

(22) Filed: Mar. 16, 2021

(51) Int. Cl.
*F16M 11/28* (2006.01)
*G01D 11/30* (2006.01)
*F16M 11/12* (2006.01)

(52) U.S. Cl.
CPC ........... *F16M 11/28* (2013.01); *F16M 11/123* (2013.01); *G01D 11/30* (2013.01); *F16M 2200/08* (2013.01)

(58) Field of Classification Search
CPC ...... G01D 11/30; F16M 11/28; F16M 11/123; F16M 2200/08; A45C 15/02; A45C 2200/15; A45F 2003/003; A47B 3/10
USPC ............................... 248/225.11, 157; 190/11
See application file for complete search history.

(56) References Cited

U.S. PATENT DOCUMENTS

| | | | | |
|---|---|---|---|---|
| 3,596,866 A | * | 8/1971 | Baker | A47B 97/08 190/11 |
| 5,400,234 A | * | 3/1995 | Yu | F16M 11/10 362/399 |
| 5,707,033 A | * | 1/1998 | Holt | H01Q 1/125 248/225.11 |
| 7,470,036 B2 | * | 12/2008 | Deighton | F21L 14/04 362/411 |
| 7,484,858 B2 | * | 2/2009 | Deighton | F21L 14/04 362/411 |
| 9,845,915 B2 | | 12/2017 | Jose | |

(Continued)

FOREIGN PATENT DOCUMENTS

DE 4041588 A1 6/1992

OTHER PUBLICATIONS

4mm MoVeo Videoscope, USA Borescopes Website, Feb. 9, 2021.
International Search Report of International Application No. PCT/US2022/071084 dated Jun. 22, 2022, 11 pages.

*Primary Examiner* — Christopher Garft
(74) *Attorney, Agent, or Firm* — Mintz Levin Cohn Ferris Glovsky and Popeo, PC; Lisa Adams (57) ABSTRACT

A system for mounting an inspection device to a case are provided. The system can include a case including a mounting base configured on a side of the case. The system can also include an adjustable stand removably coupled to the case via the mounting base. The adjustable stand can include a receiving portion removably coupled to the mounting base. The adjustable stand can also include a telescopic structure. The telescopic structure can have a plurality of segments. At least one segment can extend longitudinally from a second segment via at least one adjustment mechanism configured on the second segment. The adjustable stand can also include a device holder removably coupled to the second end of the telescopic structure. The device holder can be configured to removably couple with an inspection device. Apparatus and methods of mounting an inspection device to a case are also provided.

18 Claims, 9 Drawing Sheets

(56) References Cited

U.S. PATENT DOCUMENTS

| | | | |
|---|---|---|---|
| 2003/0103357 A1* | 6/2003 | Drake | F21L 2/00 |
| | | | 362/403 |
| 2008/0239712 A1 | 10/2008 | Deighton et al. | |
| 2015/0251598 A1* | 9/2015 | Andrews | F21V 23/06 |
| | | | 362/486 |
| 2015/0330558 A1 | 11/2015 | Intravatola | |
| 2016/0360303 A1* | 12/2016 | Armstrong | G06F 1/1684 |
| 2017/0055698 A1* | 3/2017 | Jose | F16B 7/105 |

* cited by examiner

CASE MOUNTED STAND

BACKGROUND

Industrial operations can include monitoring and inspecting assets to characterize and detect changes in the assets. Assets can include vessels, industrial machinery, and equipment, such as rotating equipment, which can be associated with aviation, power generation, and oil and gas production environments. Inspection equipment can be utilized to perform the monitoring and inspection. The inspection equipment can be transported to the location of the asset to conduct the inspection in a protective container or case. It can be desirable to provide features of the container or case to aid an operator of the inspection equipment performing inspection of the asset.

SUMMARY

Inspection operators commonly transport inspection equipment or devices to an inspection site in a container or case containing the inspection equipment. At the inspection site, the inspection operator can remove the inspection device from the case in order to conduct the inspection. Often the inspection operator manipulates the inspection device manually to perform the inspection. Manual handling can introduce risk that the inspection device can be damaged, such as dropping the inspection equipment or colliding the inspection device with other structures present within the inspection area.

With these risks in mind, it can be advantageous for the inspection operator to utilize the inspection device in a "hands-free" mode of use. Hands-free operation can enable the inspection operator to position the inspection device in a relatively fixed position with respect to an asset being inspected so that the inspection operator's hands are free to manipulate portions of the inspection device or the asset being inspected. It can be desirable to have adjustable features for positioning the inspection device relative to the asset under inspection and/or the inspection operator.

In general, apparatuses, systems, and methods of use are provided for mounting an inspection device to a case. In one aspect, an apparatus for mounting an inspection device to a case is provided. In one embodiment, the apparatus can include a mounting base configured on a side of a case. The apparatus can also include a receiving portion removably coupled to the mounting base. The apparatus can further include a telescopic structure having a first end and a second end. The first end can be configured to removably couple with the receiving portion. The telescopic structure can include a plurality of segments. At least one segment can extend longitudinally from a second segment via at least one adjustment mechanism configured on the second segment. The apparatus can also include a device holder configured to removably couple with an inspection device.

In another embodiment, the apparatus can be configured to be stored in within the case in one of an assembled, a partially assembled, or a disassembled configuration. In another embodiment, the receiving portion can include a pair of flange structures configured to be removably coupled with a channel in the mounting base, a standoff portion extending horizontally away from the pair of flange structures, and a receiving cavity in which the first end of the telescopic structure is removably coupled. In another embodiment, the at least one adjustment mechanism can be configured to adjust a height of the telescopic structure. In another embodiment, the device holder can be removably coupled to the inspection device via a threaded connection. In another embodiment, the device holder includes a gimballed adjustment mechanism. In another embodiment, the mounting base can be configured to removably couple to the side of the case via one of screws, bolts, or friction fit. In another embodiment, the inspection device can be a remote visual inspection device or a non-destructive testing device. In another embodiment, the at least one adjustment mechanism can include a clutch lock, a split collar lock, a spring button lock, a snap lock, or a set knob lock. In another embodiment, the plurality of segments can include at least two segments, at least three segments, or at least four segments. In another embodiment, the telescopic structure can include a circular-shaped cross-section.

In another aspect, a system for mounting an inspection device to a case is provided. In one embodiment, the system can include a case. The case can include a mounting base configured on a side of the case. The system can also include an adjustable stand removably coupled to the case via the mounting base. The adjustable stand can include a receiving portion removably coupled to the mounting base. The adjustable stand can also include a telescopic structure having a first end and a second end. The first end can be configured to removably couple to the receiving portion. The telescopic structure can have a plurality of segments. At least one segment can extend longitudinally from a second segment via at least one adjustment mechanism configured on the second segment. The adjustable stand can also include a device holder removably coupled to the second end of the telescopic structure. The device holder can be configured to removably couple with an inspection device.

In another embodiment, the case can be a ruggedized case configured to store and transport an inspection device. In another embodiment, the inspection device can be a borescope an ultrasound inspection device, or an eddy current inspection device. In another embodiment, the case can include a hinged lid and wheels.

In another aspect, a method of mounting an inspection device to a case is provided. In one embodiment, the method can include providing a case including an inspection device and an adjustable stand for mounting an inspection device to the case. The case can include a mounting base configured on a side of case. The method can also include removing the adjustable stand from the case. The method can further include mounting the adjustable stand to the case via the mounting base. The method can also include mounting the inspection device to the adjustable stand.

In another embodiment, mounting the adjustable stand to the case can include coupling a receiving portion of the adjustable stand to the mounting base, inserting a first end of a telescopic structure of the adjustable stand into the receiving portion, and adjusting a height of the telescopic structure. In another embodiment, mounting the inspection device to the adjustable stand can include coupling the inspection device to a device holder of the adjustable stand and positioning the inspection device for an inspection. In another embodiment, positioning the inspection device for inspection can include adjusting a gimballed adjustment mechanism of the device holder. In another embodiment, the method can also include performing an inspection using the inspection device mounted to the adjustable stand.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Inspection equipment can include a variety of non-limiting devices, such as a borescope, an ultrasound device, and a video camera. Inspection equipment can include hand-held equipment that requires an inspection operator to hold and manipulate the inspection equipment during an inspection. Often the inspection equipment can include multiple portions, such as a display screen within a housing that is coupled to a probe. It can be problematic for an inspection operator to manipulate all portions of the inspection equipment simultaneously without risking damage to the inspection equipment, the inspection operator, or the assets being inspected.

A stand for mounting an inspection device to a case is provided herein. The stand can be stored in a case including the inspection device and can be deployed from the case at an inspection location where the inspection device is to be operated. The stand can secure the inspection device to the case and can provide an adjustable mechanism to allow an inspection operator to perform an inspection of an asset in a safe, secure, hands-free manner while using the inspection device. The stand described herein can be easily mounted to a variety of non-limiting cases or containers and can be easily adjusted to a configurable height so that the inspection device can be readily positioned as desired by the inspection operator. The case mounted stand and system described herein can be rapidly deployed and assembled without requiring specialized installation device or personnel to configure. The case mounted stand can be stowed within the case with (or without) the inspection equipment thereby avoiding the need for transporting and utilizing additional stands or support structures to hold the inspection device at a suitable working height or position for the inspection operator.

Embodiments of the present disclosure describe an apparatus, system, and method for mounting an inspection device to a case for use in asset inspection and monitoring of industrial assets in an oil and gas production environment. However, it can be understood that embodiments of the disclosure can be employed for use inspecting and monitoring of any type of asset, equipment, or machinery in any industrial or non-industrial environment without limit.

Figure 1:
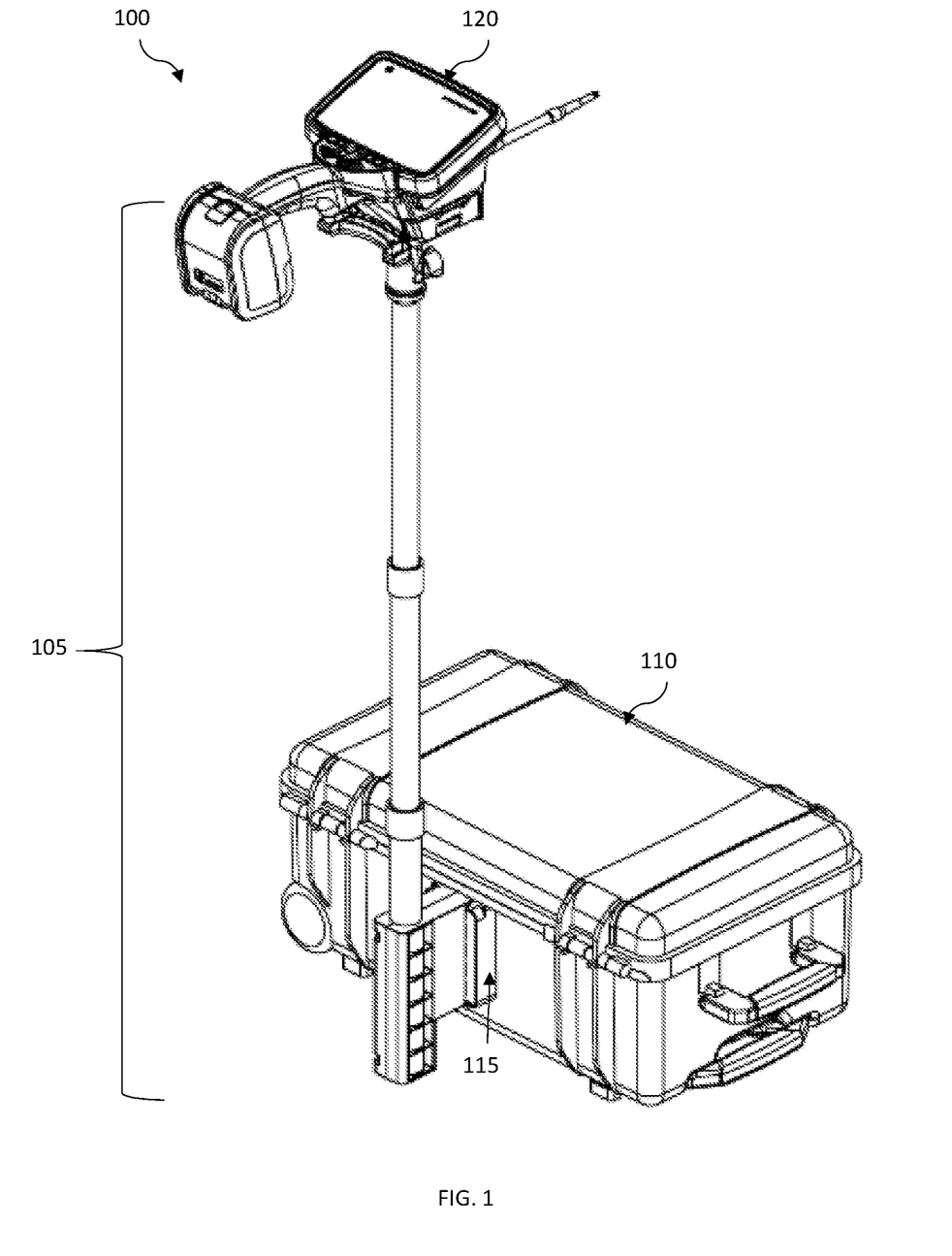
FIG. 1 is a diagram illustrating a perspective view of one example embodiment of a case mounted stand system according to implementations described herein.

FIG. 1 is a diagram illustrating a perspective view of one example embodiment of a case mounted stand system 100 according to implementations described herein. As shown in FIG. 1, the system 100 includes an adjustable stand 105 that can be removably coupled to a case 110 via a mounting base 115. The mounting base 115 can be removably coupled to a side of the base and can receive the adjustable stand 105 therein to provide a height-adjustable structure and working platform for an inspection device 120. The adjustable stand 105 can be advantageously secured in a stable configuration that is resistant to tipping or being knocked over by securing the adjustable stand to the case via the mounting base 115. In some embodiments, the inspection device 120 is a borescope. In some embodiments, the inspection device 120 can be a portable inspection device for use in remove visual inspection or non-destructive testing and inspection, such as ultrasound or eddy current inspection devices. The system of FIG. 1 provides a stable, hands-free, height-adjustable system by which the inspection device 120 can be configured for placement during operation of the inspection device and inspection of an asset, equipment, or machinery using the inspection device 120. The inspection device 120 and the adjustable stand 105 can be stored or otherwise contained within the case 110 during transport to an inspection site and can be removed from the case for an inspection.

Figure 2:
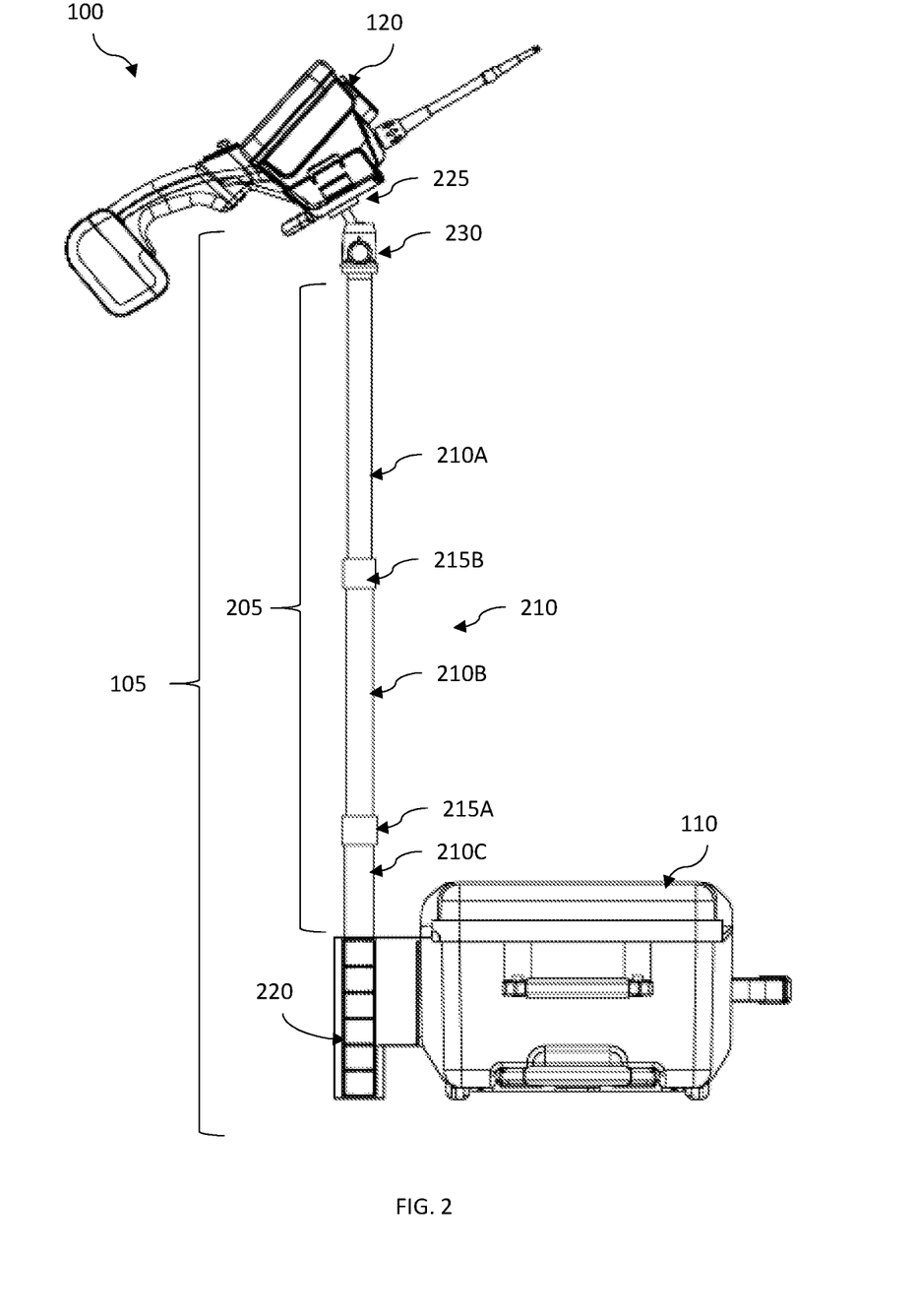
FIG. 2 is a diagram illustrating a side view of the embodiment of FIG. 1 according to implementations described herein.

FIG. 2 is a diagram illustrating a side view of the embodiment of FIG. 1 according to implementations described herein. As shown in FIG. 2, the adjustable stand 105 includes a telescopic structure 205. The telescopic structure 205 can include a plurality of segments, referred to collectively as segments 210 or individually as segments 210A-210C. One or more segments of segments 210 can be configured to nest within and extend from a second segment of segments 210. In some embodiments, the telescopic can also include one or more adjustment mechanisms 215. For example, as shown in FIG. 2, the telescopic structure 205 includes three segments (e.g., segments 210A-210C), which are adjustable from one another via two adjustment mechanisms 215A and 215B, which can be collectively referred to as adjustment mechanisms 215. The adjustment mechanisms 215 can enable an operator to adjust the height of the adjustable stand 105 and/or to adjust an amount of extension between two segments 210. In some embodiments, the adjustment mechanisms 215 can include a clutch lock, a split collar lock, a spring button lock, a snap lock, a set knob lock, or any combination thereof. In some embodiments, the telescopic structure 205 can include a circular-shaped cross-section, such that the segments 210 include a circular-shaped cross-section. In some embodiments, the telescopic structure 205 can include a square-shaped cross-section, such that the segments 210 include a square-shaped cross-section. In some embodiments, the telescopic structure 205 can include two, three, four, five, six, or seven segments 210. A corresponding number of adjustment mechanisms 215 can be provided depending on the number of segments 210 included in the telescopic structure 205.

As further shown in FIG. 2, the adjustable stand 105 can also include a receiving portion 220. The receiving portion 220 can receive the telescopic structure 205 therein and can coupled the telescopic structure 205 to the case 110. The adjustable stand 105 can also include a device holder 225. The device holder 225 can removably couple with the inspection device 120. For example, the inspection device 120 can be attached to the device holder 225 via a threaded connection of the device holder 225 or via friction fitting the inspection device 120 with the device holder 225. As further shown in FIG. 2, the device holder 225 can include a gimballed adjustment mechanism 230. The gimballed adjustment mechanism 230 can couple the telescopic structure 205 to the device holder 225 and can be adjusted to set a position of the inspection device 120 in one or more of a tilt, roll, or yaw configurations relative to a plane that is parallel to a surface on which the case 110 is positioned.

Figure 3:
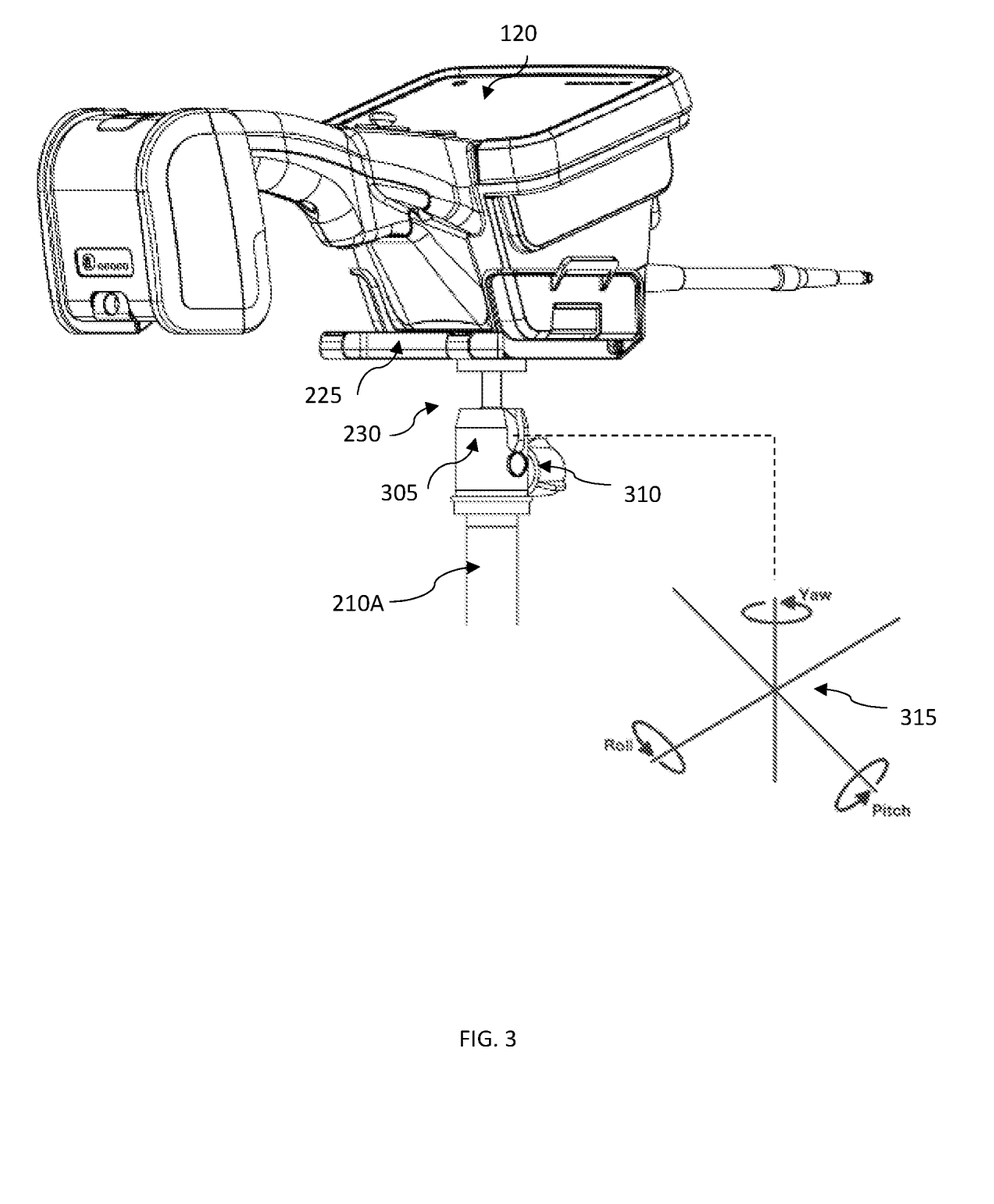
FIG. 3 is a diagram illustrating a perspective view of one example embodiment of a device holder of the case mounted stand system of FIGS. 1 and 2 according to implementations described herein.

FIG. 3 is a diagram illustrating a perspective view of one example embodiment of a device holder 225 of the case mounted stand system of FIGS. 1 and 2 according to implementations described herein. As shown in FIG. 3, the device holder 225 can be coupled to an inspection device 120. The device holder 225 can couple the inspection device 120 to a segment 210A of the telescopic structure 205 via a gimballed adjustment mechanism 230. The gimballed adjustment mechanism 230 can include a housing 305 and a gimbal locking mechanism 310 configured to secure a gimbal element within the housing 305 in a locked position. In this way, the device holder 225 can be manipulated or adjusted in a variety of positions to provide the inspection operator with different viewing angles or positions of the inspection device 120, such as one or more of positions 315.

Figure 4:
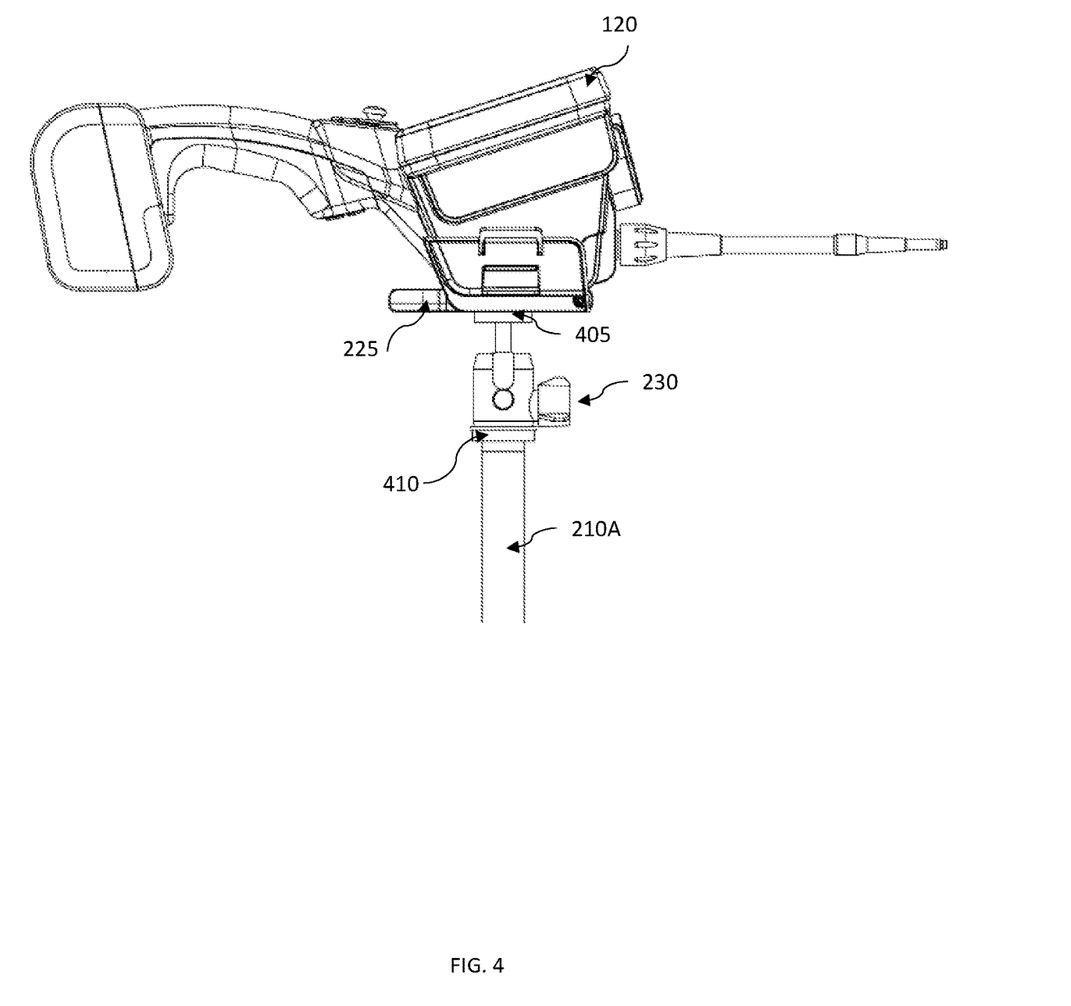
FIG. 4 is a diagram illustrating a side view of the embodiment of FIG. 3 according to some implementations described herein.

FIG. 4 is a diagram illustrating a side view of the embodiment of FIG. 3 according to some implementations described herein. As shown in FIG. 4, the device holder 225 can be coupled to segment 210C of the telescopic structure 205 via the gimballed adjustment mechanism 230. The device holder 225 can be removably coupled from the inspection device 120 via a threaded connection 405. In some embodiments, the device holder 225 can be coupled to the inspection device 120 via friction fit between one or more clips configured on the device holder 225 and/or the inspection device 120. The gimballed adjustment mechanism 230 can also include a threaded or friction fit connection 410, which can be configured to couple the adjustment mechanism 230 to a segment 210, such as segment 210A shown in FIG. 4.

Figure 5:
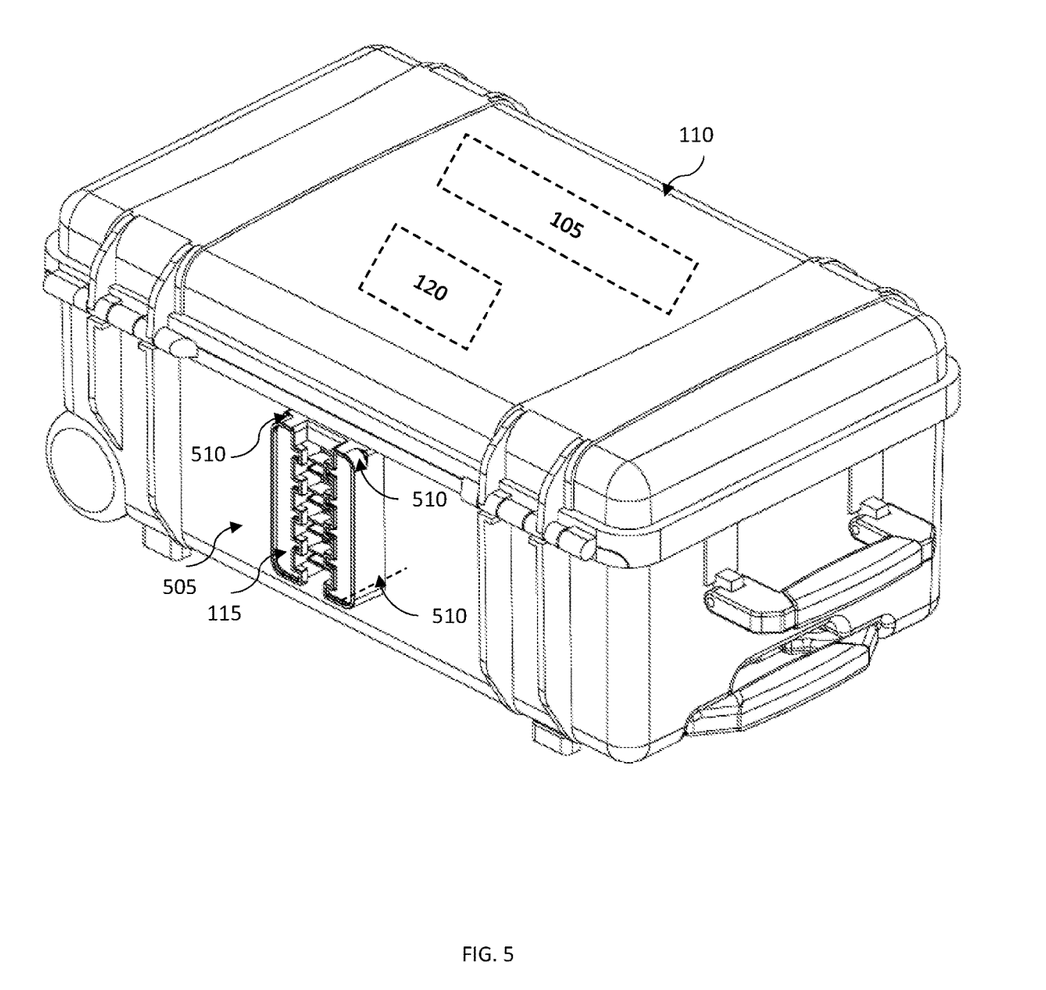
FIG. 5 is a diagram illustrating a perspective view of one example embodiment of a case of the case mounted stand system of FIG. 1 according to some implementations described herein.

FIG. 5 is a diagram illustrating a perspective view of one example embodiment of a case 110 of the case mounted stand system 100 of FIG. 1 according to some implementations described herein. As shown via dashed lines in FIG. 5, the inspection device 120 and the adjustable stand 105 can be configured for storage within the case 110. The inspection device 120 and the adjustable stand 105 can be removed from the case 110 when performing an inspection of an asset, equipment, or machine at an inspection site. The adjustable stand 105 can be stored in a dissembled state within the case 110 and can be assembled prior to performing the inspection and coupling the inspection device 120 to the adjustable stand 105. In some embodiments, the adjustable stand 105 can be stored in an assembled state in the case 110. In some embodiments, the adjustable stand 105 can be stored in a partially assembled state in the case 110. In some embodiments, the telescopic structure 205 and the receiving portion 220 can be stored in the case 110 in an assembled state (e.g., the telescopic structure 205 coupled to the receiving portion 220 can be stored in the case 110).

As further shown in FIG. 5, the mounting base 115 can be removably coupled to a side 505 of the case 110 via one or more of screws or bolts 510. In some embodiments, the mounting base 115 can be removably coupled to the case 110 via friction fit. In some embodiments, the mounting base 115 can be a molded, built-in feature of the case 110 and not removably coupled to the case 110. In some embodiments, the mounting base 115 can be positioned at a center point of a length of a side 505 of the case (as shown in FIG. 5) to maintain structural integrity of the system when fully assembled and in use. By centering the mounting base 115 on the side 505 of the case 110, the system 100 is less likely to tip over. Although shown mounted in the center of the side 505 in FIG. 5, in some embodiments, the mounting base 115 can be positioned at another location along the side 505 of the case 110 while still providing structural integrity of the system when fully assembled and in use.

Figure 6:
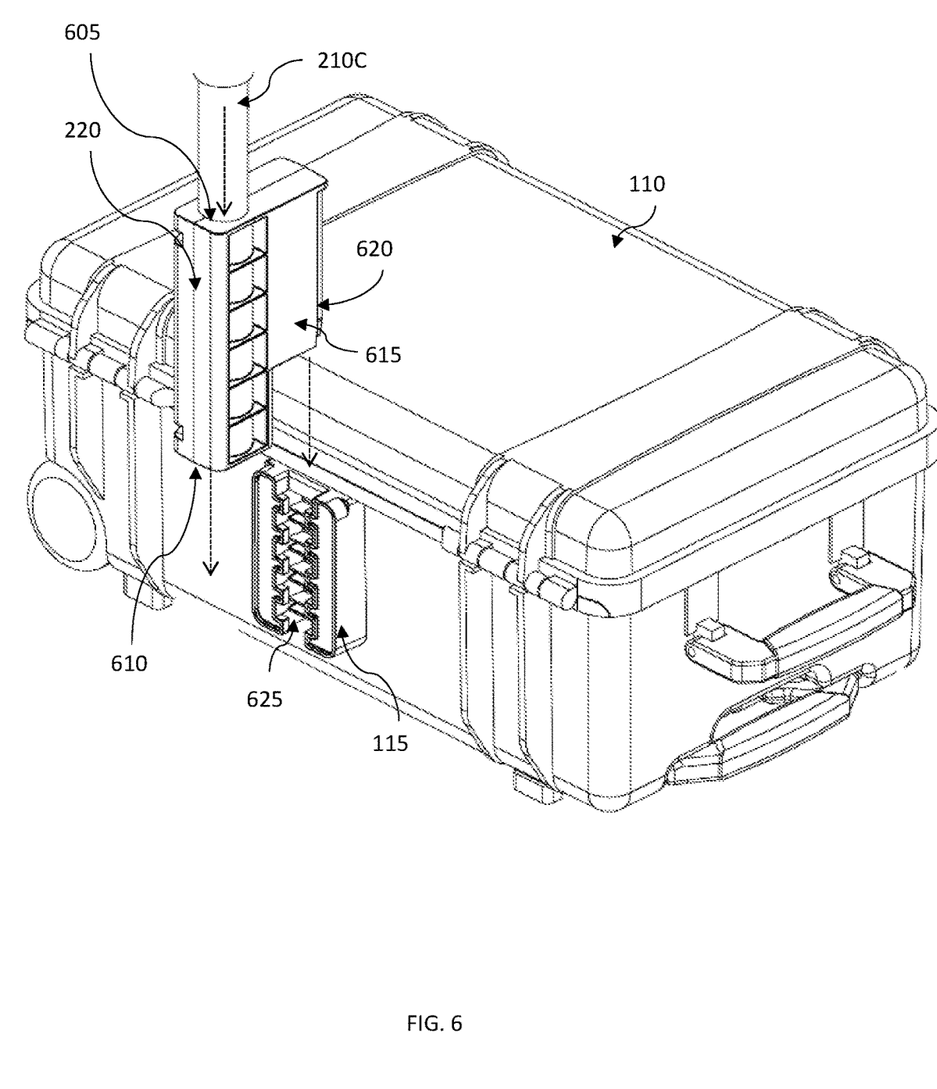
FIG. 6 is a diagram illustrating a perspective view of one example embodiment of the case mounted stand system of FIGS. 1 and 2 during assembly according to some implementations described herein.

FIG. 6 is a diagram illustrating a perspective view of one example embodiment of the case mounted stand system 100 of FIGS. 1 and 2 during assembly according to some implementations described herein. As shown in FIG. 6 via a dashed line arrow, when deployed, the segment 210C can be provided into or received by a receiving cavity 605 of the receiving portion 220. The receiving cavity 605 can be longitudinally oriented to be a parallel with a longitudinal axis or axis of extension of the telescopic structure 205. The longitudinal receiving cavity 605 can extend fully within the receiving portion 220 such that a lower end 610 of the receiving portion 220 can be in contact with a surface on which the case 110 is located to provide additional stability and rigidity to the system 100. The lower end 610 can be flush with a bottom surface of the side of the case 110 when the receiving portion 220 is fully received within the channel 625 of the mounting base 115 as shown in FIG. 8.

As further shown in FIG. 6, the receiving portion 220 also includes a standoff portion 615 configured to position the receiving portion 220 and the telescopic structure 205 away from the case 110. The standoff portion 615 can be dimensioned as to provide increased stability and rigidity of the system 100 in a deployed, assembled configuration as shown in FIG. 1. The receiving portion 220 can also include a pair of flange structures 620. The flange structures 620 can be removably coupled with a channel 625 formed within the mounting base 115. As shown via the dashed arrows below the receiving portion 220 in FIG. 6, when assembling the receiving portion 220 with the case 110, the receiving portion 220 is inserted down into the mounting base 115. The flange structure 620 can slidably engage within the channel 625 to secure the receiving portion 220 within the mounting base 115. In some embodiments, the mounting base 115 can include a plurality of segmented extensions forming the channel 625 and extending from opposite sides of the mounting base 115. In other embodiments, the channel 625 can be formed within solid extensions extending from opposite sides of the mounting base 115. In some embodiments, the receiving portion 220 can be coupled with the mounting base 115 prior to receiving the telescopic structure 205 (e.g., segment 210C) within the receiving portion 220. In some embodiments, the mounting base 115 can be a molded component of the case 110. For example, the mounting base 115 can be molded into the case 110. In some embodiments, the case 110 can include receiving features that are molded therein and the molded features can receive the telescopic structure 210 or can receive the standoff portion 615.

Figure 7:
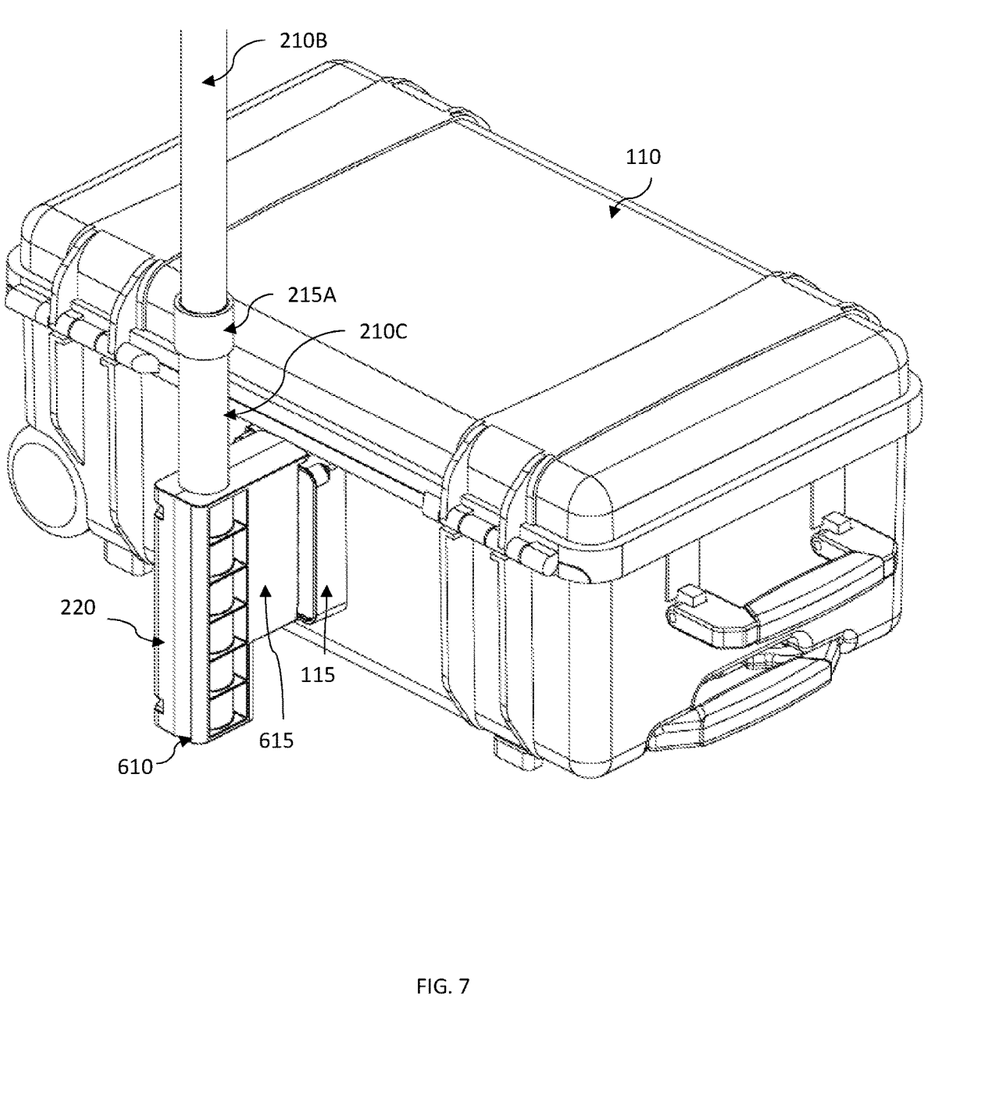
FIG. 7 is a diagram illustrating a perspective view of another example embodiment of the case mounted stand system of FIG. 1 assembled according to some implementations described herein.

FIG. 7 is a diagram illustrating a perspective view of another example embodiment of the case mounted stand system 100 of FIG. 1 assembled according to some implementations described herein. As shown in FIG. 7, the adjustable stand 105 (and segment 210C) has been mounted within the receiving portion 220 and the receiving portion 220 has been coupled with the mounting base 115. The receiving portion 220, having been coupled with and fully received within the mounting base 115 as shown in FIG. 7, positions the lower end 610 can be in contact with the surface on which the case 110 is located. The standoff portion 615 can provide an amount of distance to position the receiving portion 220 away from the case 110 to further enable the system 100 to be more rigid and resistant to tipping.

Figure 8:
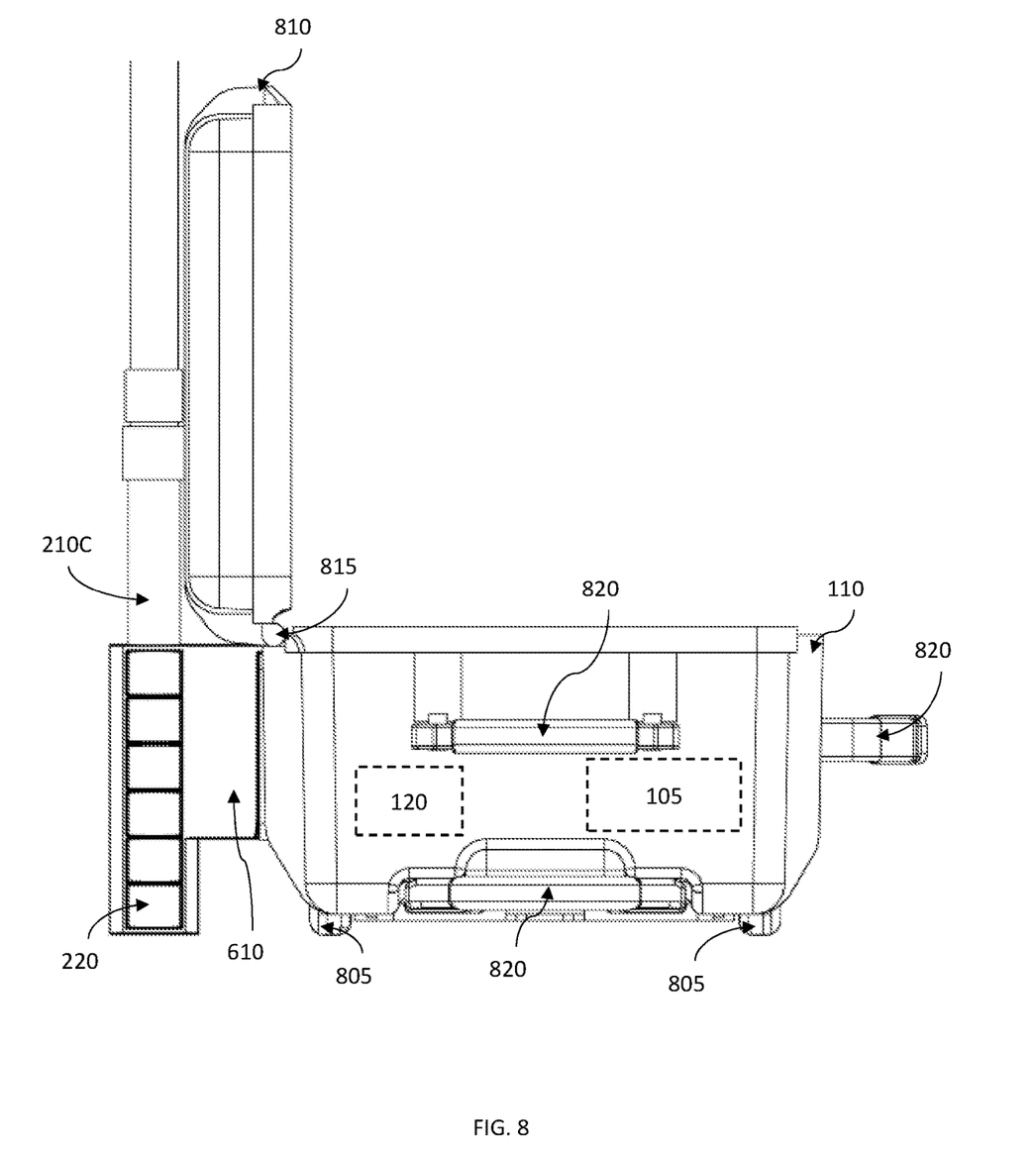
FIG. 8 is a diagram illustrating a side view of another example embodiment of a deployed configuration of the case mounted stand of FIG. 1 according to some implementations described herein.

FIG. 8 is a diagram illustrating a side view of another example embodiment of an assembled configuration of the case mounted stand system 100 of FIG. 1 according to some implementations described herein. As shown in FIG. 8, the case can include one or more wheels 805 and a lid 810. The lid 810 can be secured to the case 110 via one or more hinges 815. By configuring the standoff portion 615 to position the receiving portion 220 away from the case 110, the case lid 810 can be opened while the adjustable stand 105 is in use. Inspectors may need to open the case lid 810 during an inspection to access accessories such as grippers, optical tips, wipes, gloves, or the like that may be used during an inspection.

The case 110 can be a ruggedized case configured to withstand damage during transit. In some embodiments, the case 110 can be formed of plastic, metal, wood, textiles, or any combination thereof. The case 110 can store the inspection device 120 and the adjustable stand 105 (illustrated in dashed lines within the case 110) via one or more compartments or partitions configured within the case 110.

Figure 9:
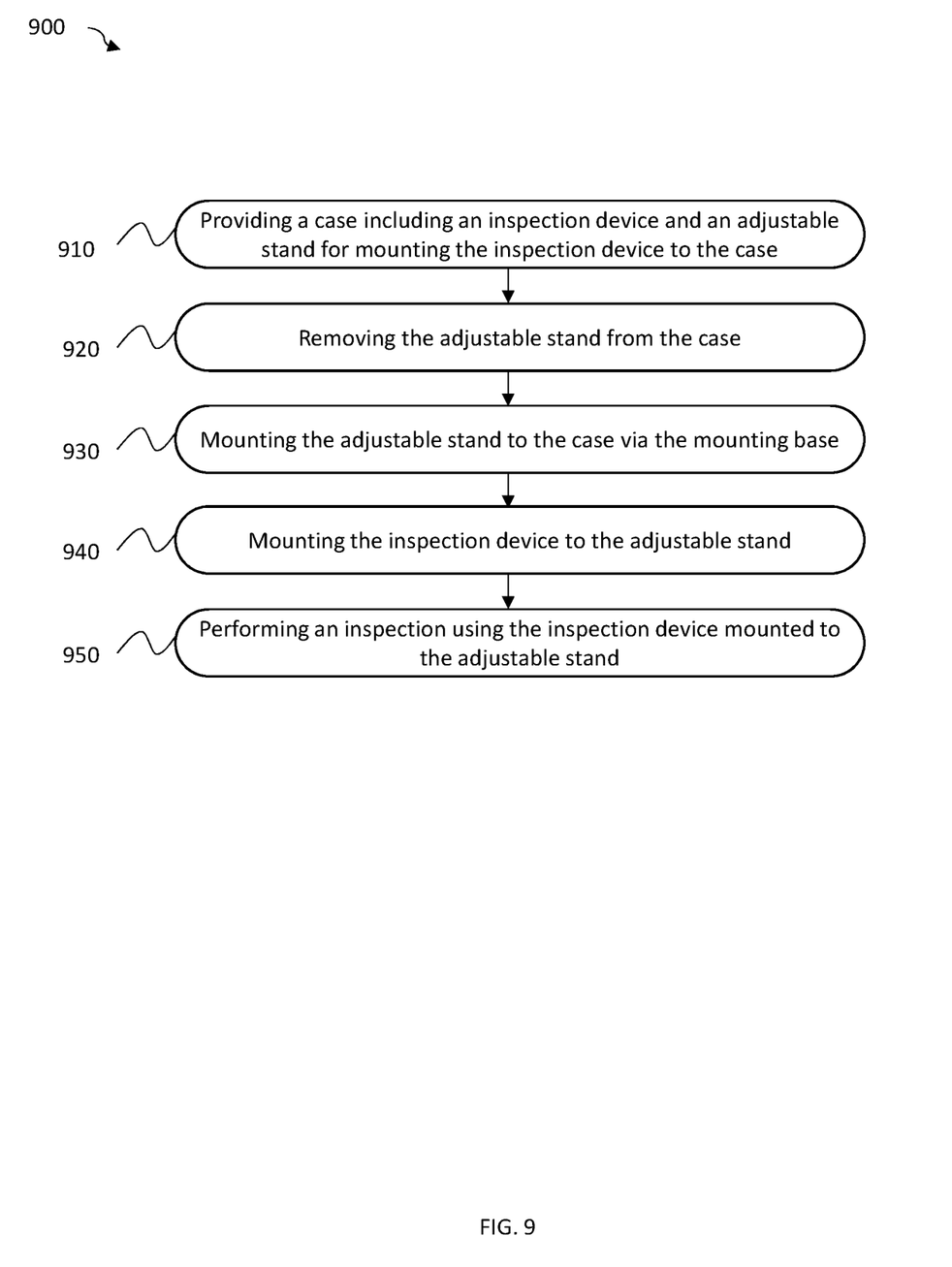
FIG. 9 is a diagram illustrating one example embodiment of a method for operating the case mounted stand system of FIG. 1.

FIG. 9 is a diagram illustrating one example embodiment of a method for operating the case mounted stand system 100 of FIG. 1. At operation 910, a case 110 including an inspection device 120 and an adjustable stand 105 for mounting the inspection device 120 to the case 110 is provided. At operation 920, the adjustable stand 105 can be removed from the case 110.

At operation 930, the adjustable stand 105 can be mounted to the case 110 via the mounting base 115 configured on the case 110. In some embodiments, the mounting base 115 may be mounted on the case 110 prior to operation 930. In other embodiments, operation 930 can include configuring the mounting base 115 on the case 110. In some embodiments, operation 930 can also include coupling a receiving portion 220 of the adjustable stand 105 to the mounting base 115. A first end of a telescopic structure 205 of the adjustable stand 105 can be inserted into the receiving portion 220, such as into the receiving cavity 605. A height of the telescopic structure 105 can be adjusted via one or more of the adjustment mechanisms 215. The height can be adjusted to place the inspection device 120 at a desired height of the inspection operator.

At operation 940, the inspection device 120 can be mounted to the adjustable stand 105. For example, the inspection device 120 can be coupled to the device holder 225 allowing the inspection device to be positioned for inspection. Positioning the inspection device 120 for inspection can include further adjusting the height of the telescopic structure 205 and/or adjusting the gimballed adjustment mechanism 230 of the device holder 225.

At operation 950, an inspection using the inspection device 120 mounted to the adjustable stand 105 can be performed.

Exemplary technical effects of the apparatuses, systems, and methods of operation described herein include, by way of non-limiting example, improved mounting of an inspection device to a case so as to provide an adjustable, hands-free configuration by which an inspection of equipment, machinery or assets can be performed by an operator using the inspection device. By providing an adjustable stand configured to deploy from within the case in which it may be transported with the inspection device to an inspection location, an operator can more safely and efficiently perform the inspection without requiring additional inspection device support structures. As a result, inspections of equipment, machines, and assets can be performed faster, in a greater number of environments, under safer inspection conditions than inspections which require an operator to carry and set up separate, complicated auxiliary support structures in order to provide an ergonomically efficient working and viewing platform for an inspection device used during the inspection.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. An apparatus for mounting an inspection device to a case, the apparatus comprising:
 a mounting base molded into a side of a case, the mounting base including a channel therein;

a receiving portion removably coupled to the channel of the mounting base, wherein the receiving portion comprises a pair of flange structures configured to be removably coupled with the channel in the mounting base, a standoff portion extending horizontally away from the pair of flange structures, wherein the receiving portion includes a lower end flush with a bottom surface of the side of the case and configured to contact a surface on which the case is positioned when the receiving portion is fully received within the channel of the mounting base, and a receiving cavity;

a telescopic structure having a first end and a second end, the first end configured to removably couple with the receiving cavity of the receiving portion, the telescopic structure having a plurality of segments, at least one segment extending longitudinally from a second segment via at least one adjustment mechanism configured on the second segment; and a device holder removably coupled to the second end of the telescopic structure, the device holder configured to removably couple with an inspection device.

2. The apparatus of claim 1, wherein the apparatus is configured to be stored within the case in one of an assembled, a partially assembled, or a disassembled configuration.

3. The apparatus of claim 1, wherein the least one adjustment mechanism is configured to adjust a height of the telescopic structure.

4. The apparatus of claim 1, wherein the device holder is removably coupled to the inspection device via a threaded connection.

5. The apparatus of claim 1, wherein the device holder includes a gimballed adjustment mechanism.

6. The apparatus of claim 1, wherein the inspection device is a remote visual inspection device or a non-destructive testing device.

7. The apparatus of claim 1, wherein the at least one adjustment mechanism includes a clutch lock, a split collar lock, a spring button lock, a snap lock, or a set knob lock.

8. The apparatus of claim 1, wherein the plurality of segments includes at least two segments, at least three segments, or at least four segments.

9. The apparatus of claim 1, wherein the telescopic structure has a circular-shaped cross-section.

10. A system for mounting an inspection device to a case comprising:

a case including a mounting base molded into a side of the case, the mounting based including a channel therein; and an adjustable stand removably coupled to the case via the mounting base, the adjustable stand including a receiving portion removably coupled to the channel of the mounting base, the receiving portion including a receiving cavity, a standoff portion, and a lower end flush with a bottom surface of the side of the case and configured to contact a surface on which the case is positioned when the receiving portion is fully received within the channel of the mounting base, wherein the standoff portion extends horizontally away from the pair of flange structures and wherein the receiving portion comprises a pair of flange structures configured to be removably coupled with the channel in the mounting base;

a telescopic structure having a first end and a second end, the first end configured to removably couple with the receiving cavity of the receiving portion, the telescopic structure having a plurality of segments, at least one segment extending longitudinally from a second segment via at least one adjustment mechanism configured on the second segment; and a device holder removably coupled to the second end of the telescopic structure, the device holder configured to removably couple with an inspection device.

11. The system of claim 10, wherein the case is a ruggedized case configured to store and transport an inspection device.

12. The system of claim 10, wherein the inspection device is a borescope, an ultrasound inspection device, or an eddy current inspection device.

13. The system of claim 10, wherein the case includes a hinged lid and wheels.

14. A method for mounting an inspection device to a case, the method comprising:

providing a case including an inspection device and an adjustable stand removably coupled to the case, wherein the case includes a mounting base molded into a side of the case, the mounting base including a channel therein and the adjustable stand includes a receiving portion including a receiving cavity, a standoff portion, and a lower end flush with a bottom surface of the side of the case and configured to contact a surface on which the case is positioned when the receiving portion is fully received within the channel of the mounting base, wherein the standoff portion extends horizontally away from the pair of flange structures and wherein the receiving portion comprises a pair of flange structures configured to be removably coupled with the channel in the mounting base;

removing the adjustable stand from the case;

coupling the adjustable stand to the case by positioning a first end of the adjustable stand within the receiving cavity of the receiving portion such that the lower end of the standoff portion contacts the surface on which the case is positioned;

removing the inspection device from the case; and mounting the inspection device to the adjustable stand.

15. The method of claim 14, wherein mounting the adjustable stand to the case comprises inserting a first end of a telescopic structure of the adjustable stand into the receiving portion; and adjusting a height of the telescopic structure.

16. The method of claim 14, wherein mounting the inspection device to the adjustable stand includes coupling the inspection device to a device holder of the adjustable stand and positioning the inspection device for an inspection.

17. The method of claim 16, wherein positioning the inspection device for inspection includes adjusting a gimballed adjustment mechanism of the device holder.

18. The method of claim 14, wherein the method further comprises performing an inspection using the inspection device mounted to the adjustable stand.

* * * * *